(12) United States Patent
Won et al.

(10) Patent No.: US 7,086,761 B2
(45) Date of Patent: Aug. 8, 2006

(54) BACKLIGHT ASSEMBLY AND LIQUID CRYSTAL DISPLAY APPARATUS HAVING THE SAME

(75) Inventors: Yong-Gwang Won, Yongin-si (KR); Jong-Dae Park, Seoul (KR); Seok-Won Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 92 days.

(21) Appl. No.: 10/512,112

(22) PCT Filed: Feb. 10, 2003

(86) PCT No.: PCT/KR03/00286

§ 371 (c)(1),
(2), (4) Date: Oct. 21, 2004

(87) PCT Pub. No.: WO03/102680

PCT Pub. Date: Dec. 11, 2003

(65) Prior Publication Data

US 2005/0140844 A1   Jun. 30, 2005

(30) Foreign Application Priority Data

May 31, 2002  (KR) ............................... 2002-30718

(51) Int. Cl.
*F21V 29/00* (2006.01)
(52) U.S. Cl. ...................... 362/373; 362/632
(58) Field of Classification Search ........ 362/613–614, 362/373, 260, 294, 632; 349/61, 63, 65
See application file for complete search history.

(56) References Cited

U.S. PATENT DOCUMENTS

| | | | |
|---|---|---|---|
| 5,146,354 A | 9/1992 | Plesinger | 359/49 |
| 5,677,746 A * | 10/1997 | Yano | 349/58 |
| 5,726,722 A * | 3/1998 | Uehara et al. | 349/66 |
| 6,108,060 A * | 8/2000 | Funamoto et al. | 349/65 |
| 6,392,724 B1 | 5/2002 | An et al. | 349/58 |
| 6,854,856 B1 * | 2/2005 | Shin et al. | 362/613 |
| 6,950,154 B1 * | 9/2005 | Lee | 349/58 |
| 2005/0276072 A1 * | 12/2005 | Hayashi et al. | 362/609 |

FOREIGN PATENT DOCUMENTS

DE   39 35 842 A 1   5/1991

* cited by examiner

Primary Examiner—Ali Alavi
(74) Attorney, Agent, or Firm—Cantor Colburn LLP

(57) ABSTRACT

There are provided a backlight assembly (200) and an LCD apparatus (110) having the same. A lamp unit (210, 220) is received in a first receiving container (300) having a first bottom surface (350) and a first sidewall (310) so that the lamp unit (210) faces the first sidewall. The lamp unit (210, 220) and the first receiving container (300) are received in a second receiving container (500) having a second bottom surface (550) and a second sidewall (510). A heat transfer member (261, 263) comprised of metal material having superior heat conductivity makes contact with the second receiving container (500) through the lamp unit (210, 220). The heat emitted from the lamp unit (210, 263) and discharged to exterior. Accordingly, the backlight assembly and the LCD apparatus may improve display characteristics thereof.

18 Claims, 16 Drawing Sheets

BACKLIGHT ASSEMBLY AND LIQUID CRYSTAL DISPLAY APPARATUS HAVING THE SAME

TECHNICAL FIELD

The present invention relates to a backlight assembly and a liquid crystal display (LCD) apparatus having the same, and more particularly, to a backlight assembly for improving display characteristics and an LCD having the same.

BACKGROUND ART

Information processing devices have developed to include various shapes and functions with rapid data processing speed. In such information processing devices, processed information in the form of an electric signal requires a display device as an interface.

An LCD apparatus having a light weight and a compact size, as compared with a CRT type display device, has been developed to achieve full-color and high-resolution functions. An LCD apparatus is widely used for a monitor of a computer, a television receiver and another display device.

FIG. 1 is an exploded perspective view showing a conventional LCD apparatus.

Referring to FIG. 1, a mold frame 10 receives first and second lamp units 16 and 18 having a plurality of lamps, respectively. The first and second units 16 and 18 disposed at opposite end portions of a mold frame 10 are covered by mean of first and second lamp reflectors 12 and 18 to reflect light emitted from the first and second lamp units 16 and 18.

The mold frame 10 receives a light guide plate 22 disposed between the first and second lamp units 16 and 18 and a reflecting plate 20 disposed under the light guide plate 22. The light guide plate 22 guided the light emitted from the first and second lamp units 16 and 18 and the reflecting plate 20 reflects the light leaked from the light guide plate 22.

An optical sheet 26 is disposed on the light guide plate 22 so as to control optical properties of the light emitted from the light guide plate 22 and a display unit 28 is disposed on the optical sheet 26 so as to display image in response to the light provided from the optical sheet 26.

The mold frame 10 is combined with a top chassis 30 disposed on the display unit 28 so as to fix the display unit 28 to the mold frame 10. The top chassis 30 has an opening so that an effective display area of the display unit 28 is exposed.

In the LCD apparatus 40 that displays image using light emitted from the first and second lamp units 16 and 18, quantity of the light required to display image increases based on a size of the effective display area of the display unit 28. That is, in order to provide light having uniform brightness from the first and second lamp units 16 and 18 to the display unit 28 regardless of the display area on which image is displayed, quantity of light proportional to increase of the size of the LCD apparatus 40 is required.

For this purpose, the LCD apparatus 40 that employs a plurality of lamps is widely used as shown in FIG. 1.

However, when the number of the lamps of the first and second lamp units 16 and 18 increases so as to obtain quantity of light appropriate to display image, heat emitted from the lamps increases.

The heat emitted from the lamps applies damage to the light guide plate 22, the optical sheet 26 and the display unit 28 disposed adjacent to the first and second lamp units 16 and 18, so that the display characteristics of the LCD apparatus 40 are deteriorated.

DISCLOSURE OF THE INVENTION

Accordingly, the present invention has been devised to solve the foregoing problems of the conventional art, and it is a first object of the present invention to provide a backlight assembly for improving display characteristics.

It is a second object of the present invention to provide an LCD for display characteristics for reducing the deterioration of the display characteristics.

To accomplish the first object, there is provided a backlight assembly comprising: a lamp unit for generating light; a first receiving container having a first bottom surface and a first sidewall extended from the first bottom surface, for receiving the lamp unit such that the lamp unit faces the first sidewall; a second receiving container having a second bottom surface and a second sidewall extended from the second bottom surface, for receiving the lamp unit and the first receiving container; and a heat transfer member disposed at the lamp unit, for transferring heat emitted from the lamp unit to the second receiving container.

To accomplish the second object, there is provided an LCD apparatus comprising: a lamp unit for generating light; a first receiving container having a first bottom surface and a first sidewall extended from the first bottom surface, for receiving the lamp unit such that the lamp unit faces the first sidewall; a second receiving container having a second bottom surface and a second sidewall extended from the second bottom surface, for receiving the lamp unit and the first receiving container; a heat transfer member disposed at the lamp unit, for transferring heat emitted from the lamp unit to the second receiving container; and an LCD panel for receiving the light and displaying image in response to the light.

BRIEF DESCRIPTION OF THE DRAWINGS

The above objects and other advantages of the present invention will become more apparently by describing in detail the preferred embodiments thereof with reference to the accompanying drawings, in which.

BEST MODE FOR CARRYING OUT THE INVENTION

Figure 2:
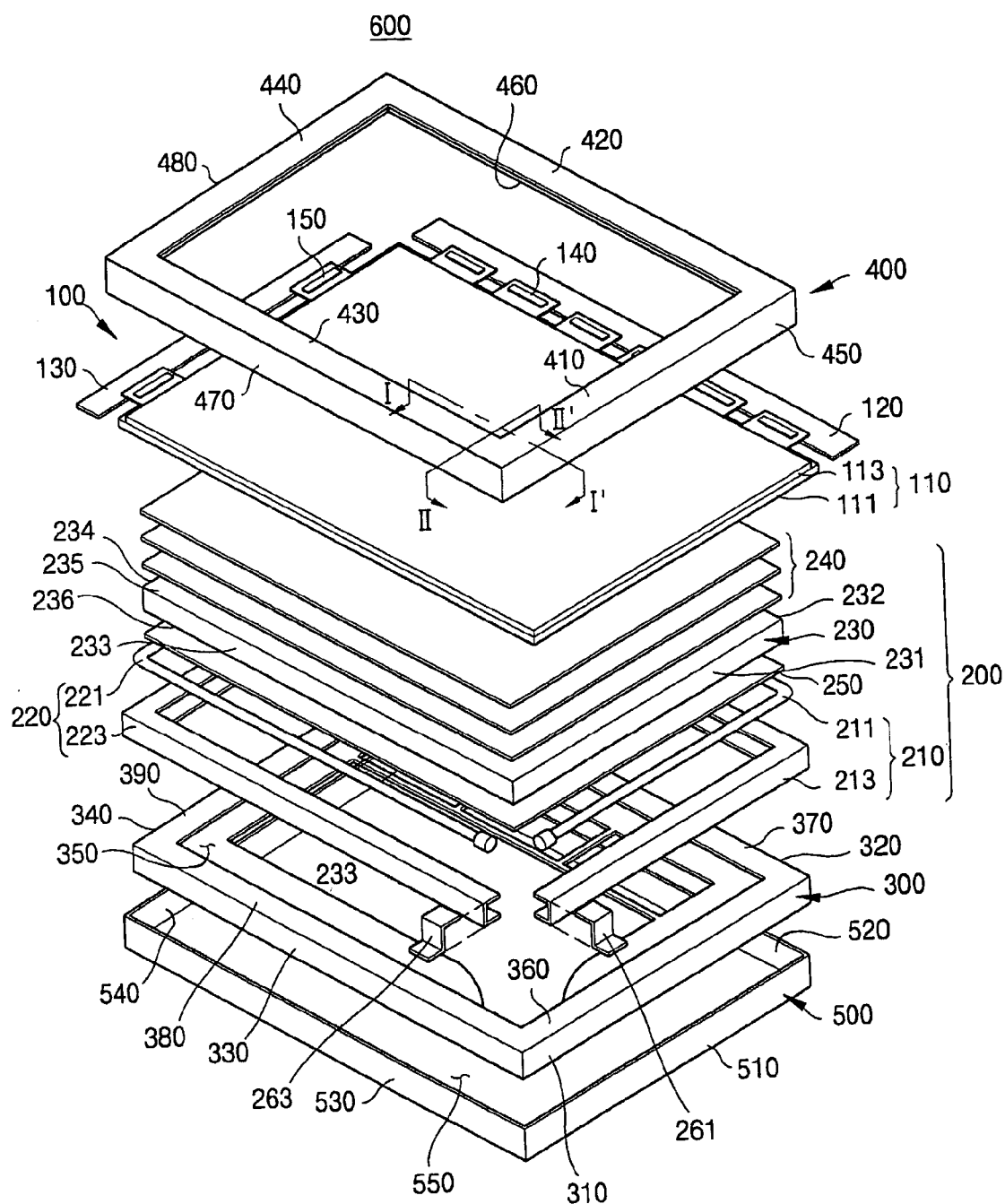
FIG. 2 is an exploded perspective view showing an LCD apparatus according to an exemplary embodiment of the present invention.
Figure 3:
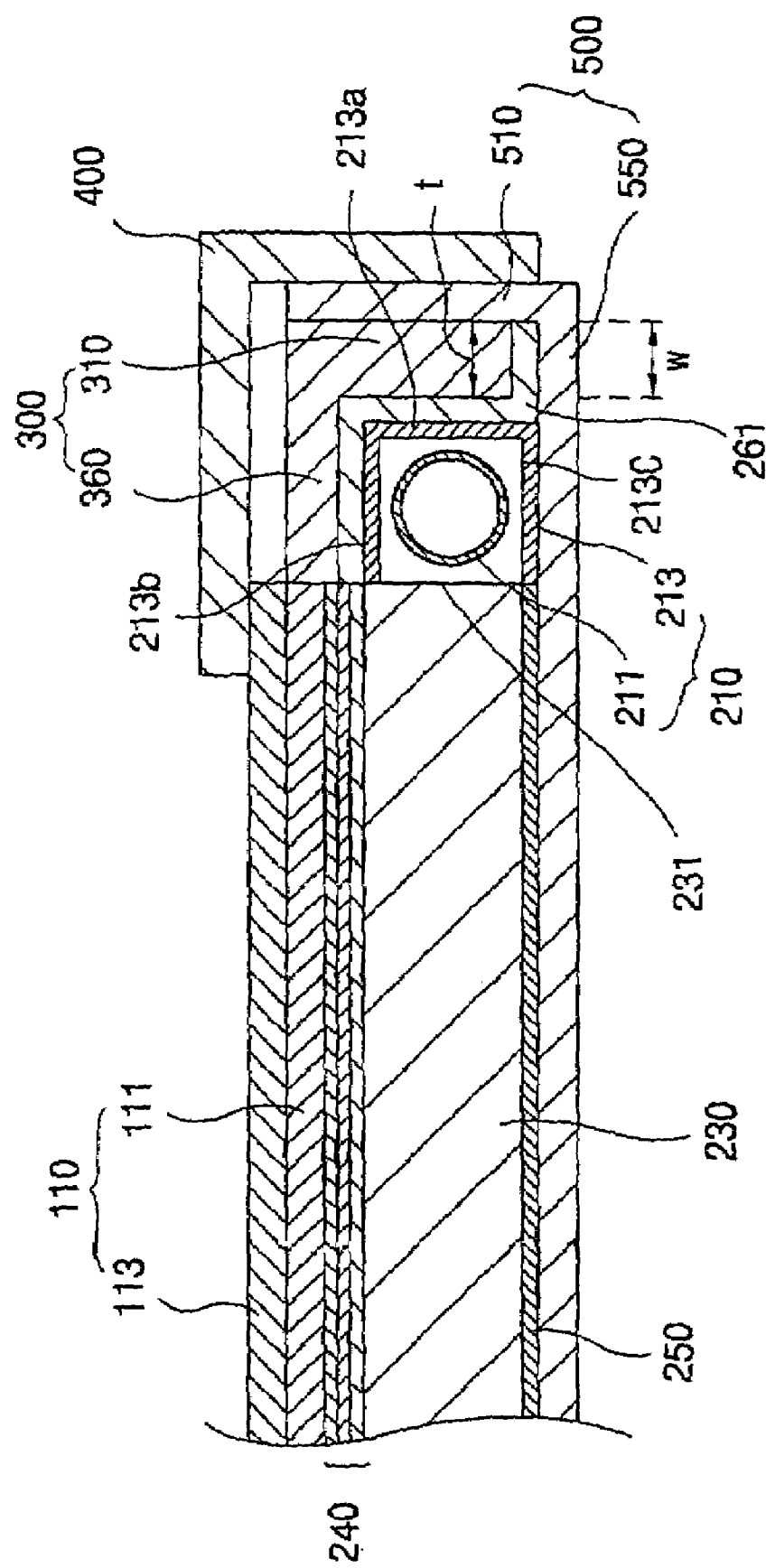
FIG. 3 is a cross-sectional view taken along the line I–I' showing the LCD apparatus shown in FIG. 2.
Figure 4:
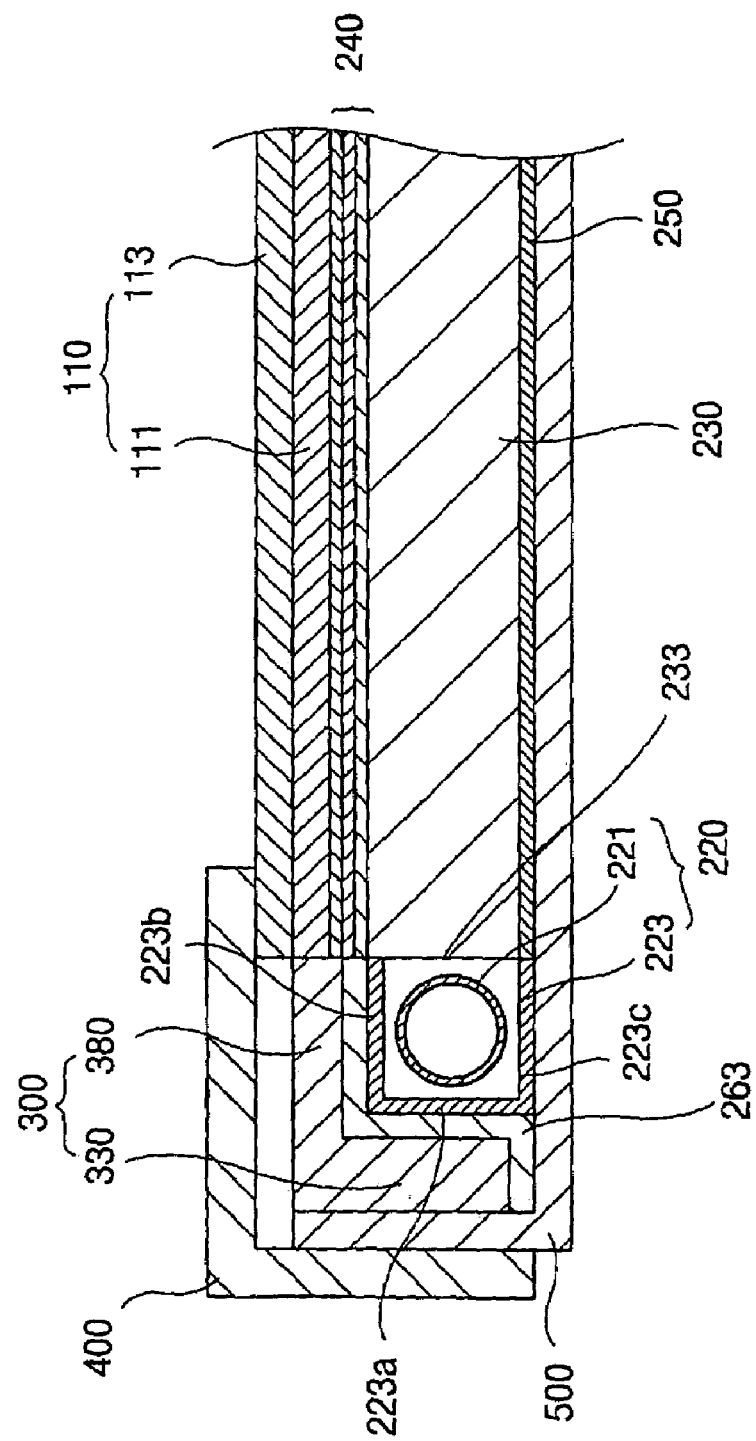
FIG. 4 is a cross-sectional view taken along the line II–II' showing the LCD apparatus shown in FIG. 2.

FIG. 2 is an exploded perspective view showing an LCD apparatus according to an exemplary embodiment of the present invention. FIG. 3 is a cross-sectional view taken along the line I–I' showing the LCD apparatus shown in FIG. 2. FIG. 4 is a cross-sectional view taken along the line II–II' showing the LCD apparatus shown in FIG. 2.

Referring to FIG. 2, the LCD apparatus 600 includes a display unit 100 for receiving image signals and displaying image and a backlight assembly 200 for supplying light to the display unit 100.

The display unit 100 includes an LCD panel 110, a data PCB (Printed Circuit Board) 120, a gate PCB (Printed Circuit Board) 130, a data TCP (Tape Carrier Package) 140 and a gate TCP (Tape Carrier Package) 150. The LCD panel 110 includes a TFT (Thin Film Transistor) substrate 111, a color filter substrate 113 and a liquid crystal interposed between the TFT substrate 111 and the color filter substrate 113.

The TFT substrate 111 is a transparent glass substrate on which TFTs are disposed in a matrix configuration. Each of the TFTs includes a source terminal connected to a data line, a gate terminal connected to a gate line and a drain terminal having a pixel electrode comprised of ITO (Indium Tin Oxide), which is a transparent conductive material. When an electric signal is applied to the data and the gate lines, the source and the gate terminals of each the TFTs receive the electric signal through the data and gate lines. Responsive to the electric signal, the TFTs are turned on or turned off, so that the drain terminal receives the electric signal needed to form a pixel.

The color filter substrate 113 is disposed facing to the TFT substrate 111. RGB pixels, which are color pixels for emitting predetermined colors when the light passes therethrough, are disposed on the color filter substrate 113 through a thin film process. A common electrode comprised of ITO is disposed on an entire surface of the color filter substrate 113.

When a power is applied to the gate and source terminals of the TFTs disposed on the TFT substrate 111, the TFTs are turned on so that an electric field is generated between the pixel electrode and the common electrode of the color filter substrate 113. The electric field varies an aligning angle of the liquid crystal interposed between the TFT substrate 111 and the color filter substrate 113. Accordingly, a light transmittance of the liquid crystal is varied according to the variation of the aligning angle of the liquid crystal, so a desired image may be obtained.

Figure 1:
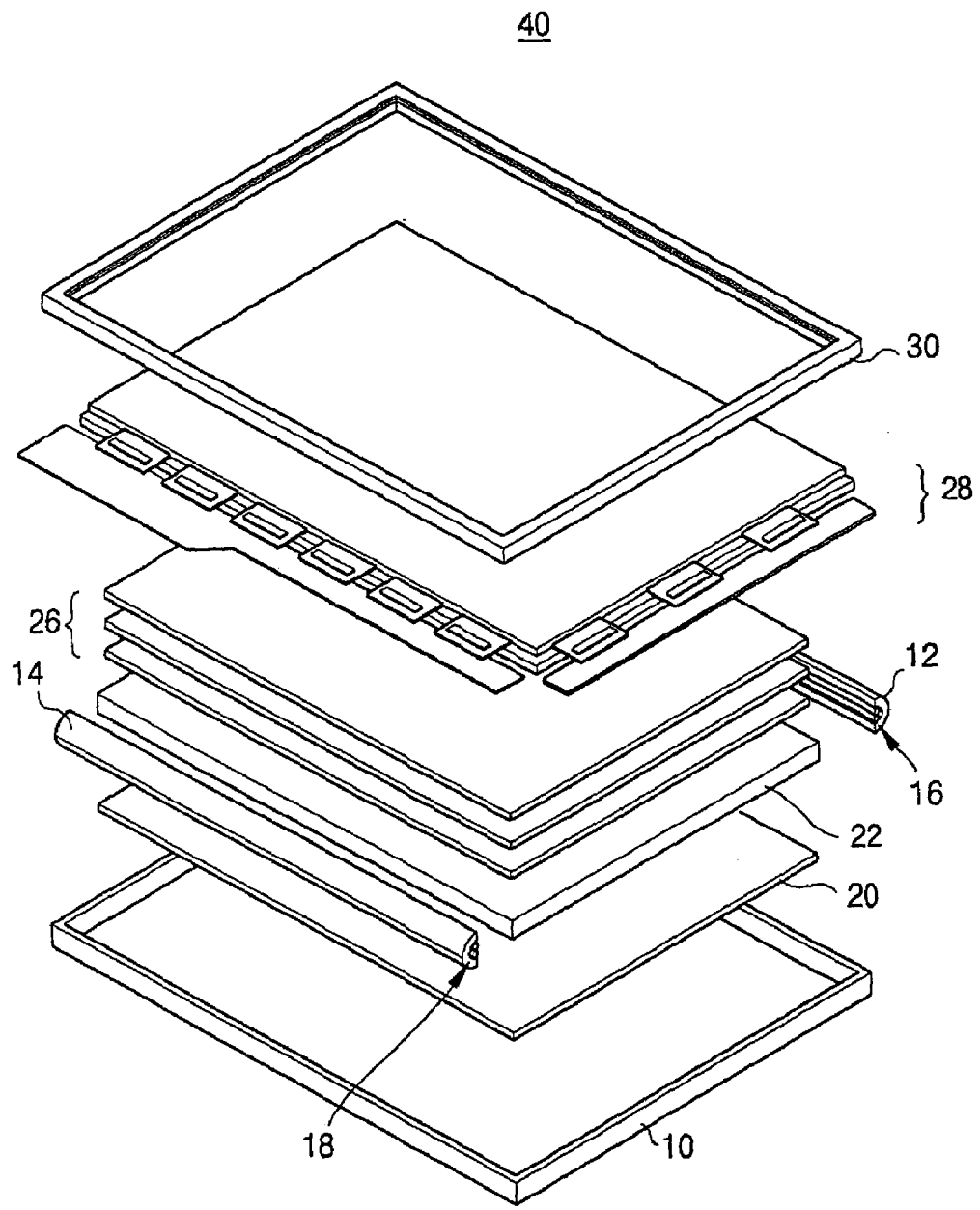
FIG. 1 is an exploded perspective view showing a conventional LCD apparatus.

As shown in FIG. 1, the data TCP 140 is connected to the data line of the LCD panel 110 so as to decide an applying timing of a data driving signal and the gate TCP 150 is connected to the gate line of the LCD panel 110 so as to decide an applying timing of a gate driving signal. The data PCB 120 for receiving an image signal from an external and applying the data driving signal to the data line is connected to the data TCP 140 and the gate PCB 130 for applying the gate driving signal to the gate line is connected to the gate TCP 150.

The backlight assembly 200 includes a first lamp unit 210, a second lamp unit 220, a light guide plate 230 for guiding the light to the display unit 100, an optical sheet 240, which is disposed on the light guide plate 230, for controlling visual angle of the light and a reflecting plate 250 for reflecting the light leaked from the light guide plate 230 to the display unit 100. The light guide plate 230, the first lamp unit 210, the second lamp unit 220, the optical sheet 240 and the reflecting plate 250 are received in the mold frame 300.

The light guide plate 230 includes an emitting surface 235 for emitting the light, a reflecting surface 236, which is facing to the emitting surface 235, for reflecting the light and first to fourth side surfaces 231, 232, 233 and 234 for connecting the emitting surface 235 to the reflecting surface 236 and for receiving the light.

Referring to FIGS. 2 to 4, the first lamp unit 210 includes a first L-shaped lamp 211 and a first lamp reflector 213 for covering the first L-shaped lamp 211. The second lamp unit 220 includes a second L-shaped lamp 221 and a second lamp reflector 223 for covering the second L-shaped lamp 223. The first L-shaped lamp 211 is disposed adjacent to the first and the second side surfaces 231 and 232 of the light guide plate 230 and the second L-shaped lamp 221 is disposed adjacent to the third and the fourth side surfaces 233 and 234 of the light guide plate 230.

The first lamp reflector 213 partially covers the first L-shaped lamp 211 and reflects the light emitted from the first L-shaped lamp 211 to the light guide plate 230. The first lamp reflector 213 has an L shape same to that of the first L-shaped lamp 211. The second lamp reflector 223 partially covers the second L-shaped lamp 221 and reflects the light emitted from the second L-shaped lamp 221 to the light guide plate 230. The second lamp reflector 223 has an L shape same to that of the second L-shaped lamp 221. The first and second lamp reflectors 213 and 223 is comprised of PET (Poly-Ethylene Terephthalate) resin.

The LCD apparatus 600 includes first to fourth metal plates 261, 262, 263 and 264. The first and second metal plates 261 and 262 make contact with an outer surface of the first lamp reflector 213 corresponding to opposite end portions of the first L-shaped lamp 211. The third and fourth metal plates 263 and 264 make contact with an outer surface of the second lamp reflector 223 corresponding to opposite end portions of the second L-shaped 221.

The first to the fourth metal plates 261, 262, 263 and 264 perform a function of a heat transfer member for discharging heat emitted from the first and the second lamp units 210 and 220. Therefore, the first to the fourth metal plates 261, 262, 263 and 264 are comprised of metal material, for example, aluminum or aluminum alloy. Also, the first to the fourth metal plates 261, 262, 263 and 264 may be comprised of material having superior heat conductivity, for example, silicon gel.

Referring again to FIGS. 2 to 4, the mold frame 300 includes a bottom surface 350, first to fourth sidewalls 310, 320, 330 and 340 extended from the bottom surface 350 and first to fourth upper surfaces 360, 370, 380 and 390 extended from the first to fourth sidewalls 310, 320, 330 and 340 and facing to the bottom surface 350. The light guide plate 230 is received in the receiving space such that the first to fourth sidewalls 310, 320, 330 and 340 face the first to fourth side surfaces 231, 232, 233 and 234, respectively.

The first lamp unit 210 is disposed between the first side surface 231 and the first sidewall 310 and between the second side surface 232 and the second sidewall 320. The second lamp unit 220 is disposed between the third side surface 233 and the third sidewall 330 and between the fourth side surface 234 and the fourth sidewall 340. The optical sheet 240 is disposed on the light guide plate 230.

The mold frame 300 is received in the bottom chassis 500 while receiving the reflecting plate 250, the light guide plate 230, the first lamp unit 210, the second lamp unit 220, the optical sheet 240 and the first to the fourth metal plates 261, 262, 263 and 264. The bottom chassis 500 includes a bottom surface 550, on which the mold frame 300 is received, and fifth to eighth sidewalls 510, 520, 530 and 540 facing to the first to the fourth sidewalls 310, 320, 330 and 340, respectively. The fifth to eighth sidewalls 510, 520, 530 and 540 are extended from the bottom surface 550 of the bottom chassis 500. The first to fourth metal plates 261, 262, 263 and 264 are in contact with the bottom surface 550 of the bottom chassis 500.

The bottom chassis 500 is comprised of metal material, for example, aluminum or aluminum alloy. Therefore, heat emitted from the first and second lamp units 210 and 220 may be transferred to the bottom chassis 500 through the first to the fourth metal plates 261, 262, 263 and 264 and externally discharged.

The display unit 100 is disposed on the optical sheet 240 and the bottom chassis 500 is combined with the top chassis 400. The top chassis 400 includes fifth to eighth upper surfaces 410, 420, 430 and 440 for pressurizing non-effective area of the LCD panel 110 and ninth to twelfth sidewalls 450, 460, 470 and 480 extended from the fifth to eighth upper surfaces 410, 420, 430 and 440 and facing to the fifth to eighth sidewalls 510, 520, 530 and 540, respectively. Thus, the top chassis 400 may fix the display unit 100 to the bottom chassis 500.

Figure 5:
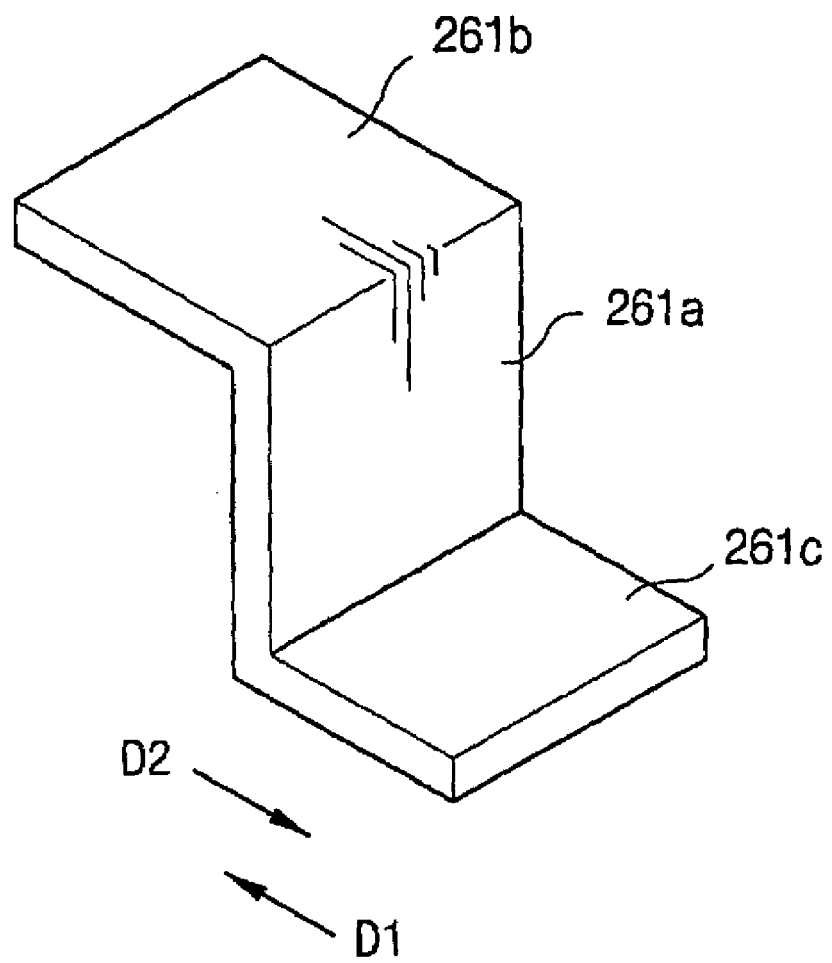
FIG. 5 is a perspective view showing the first metal plate shown in FIG. 2.
Figure 6:
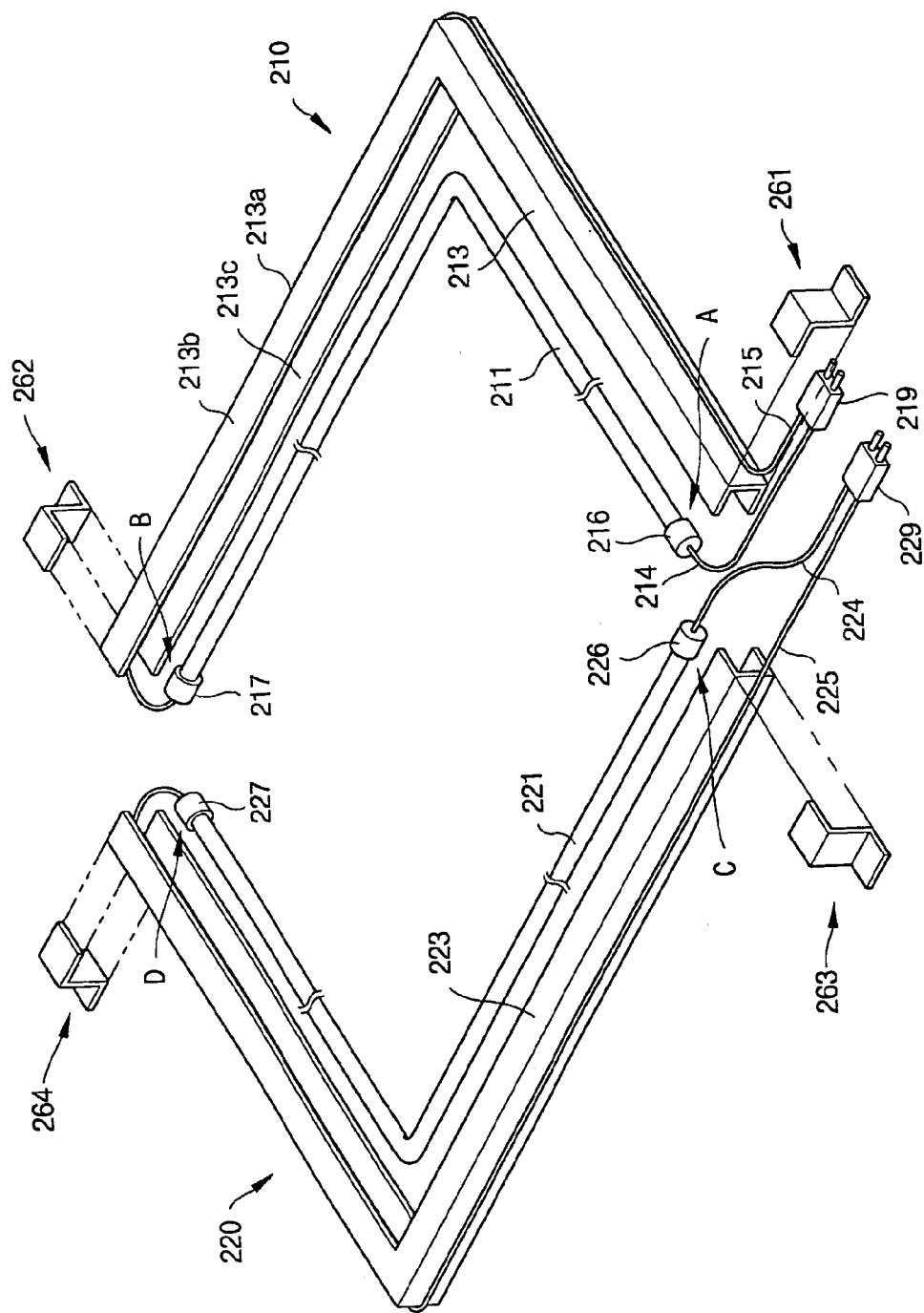
FIG. 6 is an exploded perspective view showing the first and second lamp units assembled to the first to fourth metal plates shown in FIG. 2.

FIG. 5 is a perspective view showing the first metal plate shown in FIG. 2 and FIG. 6 is an exploded perspective view showing the first and second lamp units assembled to the first to fourth metal plates shown in FIG. 2. In this exemplary embodiment, the first metal plate will be described as an exemplary embodiment of the present invention and the second to fourth metal plates having structure same to that of the first metal plate will be omitted.

Referring to FIG. 5, the first metal plate 261 includes a first side surface 261a, a first upper surface 261b extended from one end portion of the first side surface 261a in a first direction D1 and a first bottom surface 261c extended from another end portion of the first side surface 261a in a second direction D2 opposite to the first direction D1. The first upper surface 261b and the first bottom surface 261c are perpendicular to the first side surface 261a.

As shown in FIG. 6, the first lamp unit 210 includes the first L-shaped lamp 211 and the first lamp reflector 213 and the second lamp unit 220 includes the second L-shaped lamp 221 and the second lamp reflector 223.

The first L-shaped lamp 213 includes first and second electrodes (not shown) disposed at opposite end portions thereof. Hereinafter, an area on which the first electrode is disposed is referred to as a first electrode area "A" and an area on which the second electrode is disposed is referred to as a second electrode area "B". In FIG. 6, the first and the second electrodes are inwardly disposed in the first L-shaped lamp 211, however, the first and the second electrode may be outwardly disposed on the first L-shaped lamp 211.

The first lamp unit 210 further includes first and second wires 214 and 215 electrically connected to the first and the second electrodes, respectively. The first and the second wires 214 and 215 are outwardly withdrawn from the first and the second electrodes. The first and the second wires 214 and 215 are connected to a first connector 219 electrically connected to a power supply unit. The power supply unit applies high voltage to the first L-shaped lamp 211 through the first wire 214 and low voltage to the first L-shaped lamp 211 through the second wire 215. The second wire 215 is extended along the first L-shaped lamp 211 and connected to the first connector 219 with the first wire 214.

The first L-shaped lamp 211 includes first and second lamp holders 216 and 217 coupled to opposite end portions of the first L-shaped 211, respectively, so as to hold the first and the second wires 214 and 216. The first L-shaped lamp 211 is received in the first lamp reflector 213 while coupling to the first and the second lamp holders 216 and 217.

The first lamp reflector 213 has an L shape same to that of the first L-shaped lamp 211. The first lamp reflector 213 covers the first L-shaped lamp 211 while opening one side portion of the first L-shaped lamp 211. Particularly, the first lamp reflector 213 includes a first reflecting surface 213a, a second reflecting surface 213b extended from a first end portion of the first reflecting surface 213a and a third reflecting surface 213c extended from a second end portion opposite to the first end portion of the first reflecting surface 213a. The second and the third reflecting surfaces 213b and 213c are facing to each other and perpendicular to the first reflecting surface 213a.

The second lamp unit 220 includes the second L-shaped lamp 221, the second lamp reflector 223, third and fourth wires 224 and 225, third and fourth lamp holders 226 and 227 and a second connector 229. The second lamp unit 220 has structure same to that of the first lamp unit 210, so that description regarding the second lamp unit 220 will be omitted.

The second L-shaped lamp 221 includes third and fourth electrodes (not shown) disposed at opposite end portions thereof. Hereinafter, an area on which the third electrode is disposed is referred to as a third electrode area "C" and an area on which the fourth electrode is disposed is referred to as a fourth electrode area "D".

When the first and the second lamp units 210 and 220 is received in the mold frame 300, the first lamp holder 216 coupled to the first L-shaped lamp 211 is disposed adjacent to the third lamp holder 226 coupled to the second L-shaped lamp 221 and the second lamp holder 217 coupled to the first L-shaped lamp 211 is disposed adjacent to the fourth lamp holder 227 coupled to the second L-shaped lamp 221. That is, the first and the second lamp units 210 and 220 received in the mold frame 300 has a rectangular frame shape.

The first and the second metal plates 261 and 262 cover the outer surface of the first lamp reflector 213 corresponding to the first and the second electrode areas "A" and "B" of the first L-shaped lamp 211. The third and the fourth metal plates 263 and 264 cover the outer surface of the second lamp reflector 223 corresponding to the third and the fourth electrode areas "C" and "D" of the second L-shaped lamp 221.

Referring again to FIGS. 3 and 6, the first side surface 261a of the first metal plate 261 makes contact with the first reflecting surface 213a, the first upper surface 261b makes contact with the second reflecting surface 213b and the first bottom surface 261c makes contact with the bottom surface 550 of the bottom chassis 500. Thus, the first metal plate 260 may transfer heat emitted from the first L-shaped lamp 211 to the bottom chassis 500.

In this exemplary embodiment, the first bottom surface 261c has a width "w" same to a thickness "t" of the first sidewall 310 of the mold frame 300. When the width "w" of the first bottom surface 261c is greater than the thickness "t" of the first sidewall 310, the heat conductivity of the first metal plate 260 may increase because contact area between the first bottom surface 261c and the bottom surface 550 may be broadened. However, a size of the LCD apparatus 600 increases by the width "w" of the first bottom surface 261c of the first metal plate 260. When the width "w" of the first bottom surface 261c is smaller than the thickness "t" of the first sidewall 310, it is able to prevent the size of the LCD apparatus 600 from increasing. However, since the contact area between the first bottom surface 261c and the bottom surface 550 decreases, the heat conductivity of the first metal plate 260 may be lowered. Therefore, in this exemplary embodiment, the first bottom surface 261c of the first metal plate 260 has the width "w" same to the thickness "t" of the first sidewall 310 of the mold frame 300.

Figure 7:
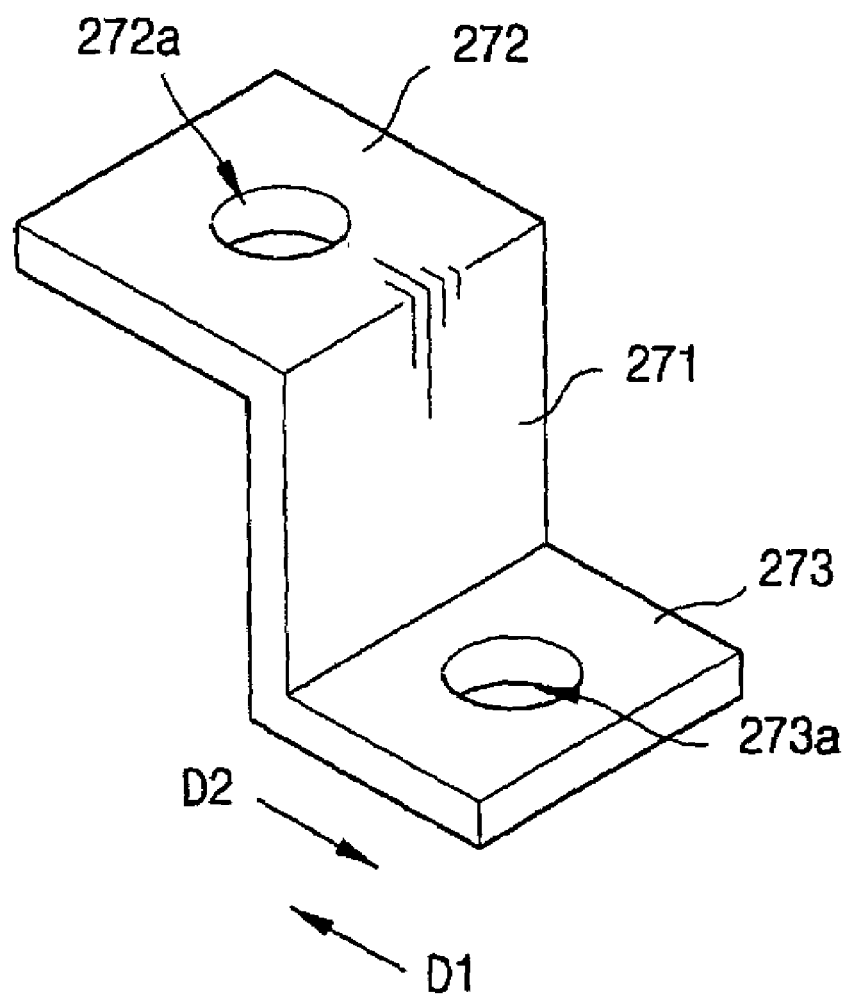
FIG. 7 is a perspective view showing a metal plate according to another exemplary embodiment of the present invention.
Figure 8:
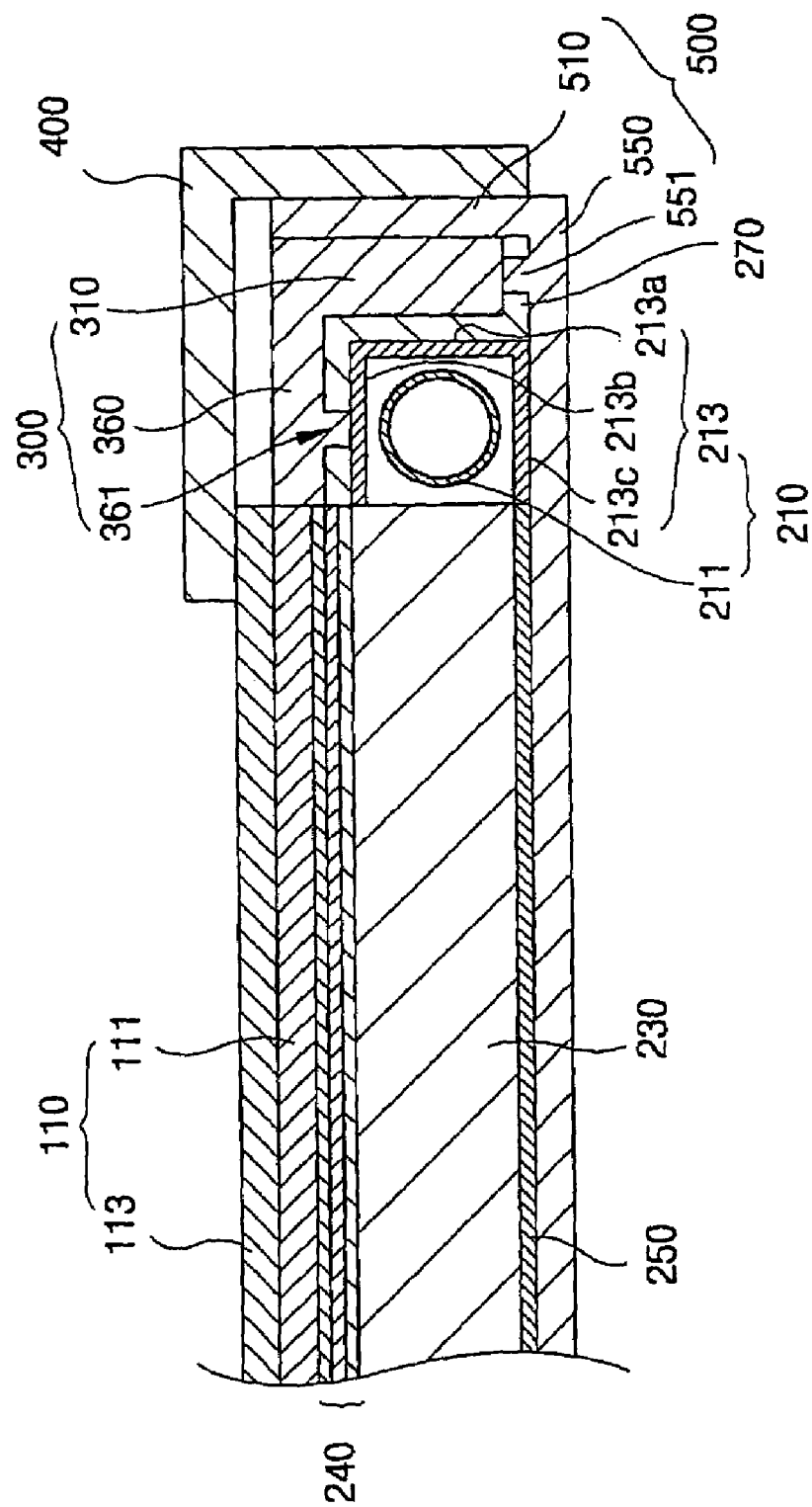
FIG. 8 is a cross-sectional view showing the metal plate assembled to the LCD apparatus shown in FIG. 2.

FIG. 7 is a perspective view showing a metal plate according to another exemplary embodiment of the present invention and FIG. 8 is a cross-sectional view showing the metal plate assembled to the LCD apparatus shown in FIG. 2. In this another embodiment, a first metal plate will be described as an exemplary embodiment of the present invention and second to fourth metal plates having structure same to that of the first metal plate will be omitted.

Referring to FIG. 7, the first metal plate 270 includes a first side surface 271, a first upper surface 272 extended from one end portion of the first side surface 271 in a first direction D1 and a first bottom surface 273 extended from another end portion of the first side surface 271 in a second direction D2 opposite to the first direction D1. The first upper surface 272 and the first bottom surface 273 are perpendicular to the first side surface 271. The first upper surface 272 is provided with a first engaging hole 272a and the first bottom surface 273 is provided with a second engaging hole 273a.

As shown in FIGS. 7 and 8, when the first metal plate 270 is combined with the first lamp unit 210, the first side surface 271 makes contact with the first reflecting surface 213a of the first lamp reflector 213 and the first upper surface 272 makes contact with the second reflecting surface 213b of the first lamp reflector 213. The mold frame 300 is received in the bottom chassis 500 while receiving the first lamp unit 210. The mold frame 300 includes a first engaging protrusion 361, which is disposed on the first upper surface 360, corresponding to the first engaging hole 272a and the bottom chassis 500 includes a second engaging protrusion 551, which is disposed on the bottom surface 550, corresponding to the second engaging hole 273a.

Accordingly, the first metal plate 270 is fixed to the mold frame 300 by inserting the first engaging protrusion 361 into the first engaging hole 272a and fixed to the bottom chassis 500 by inserting the second engaging protrusion 551 into the second engaging hole 273a.

Figure 9:
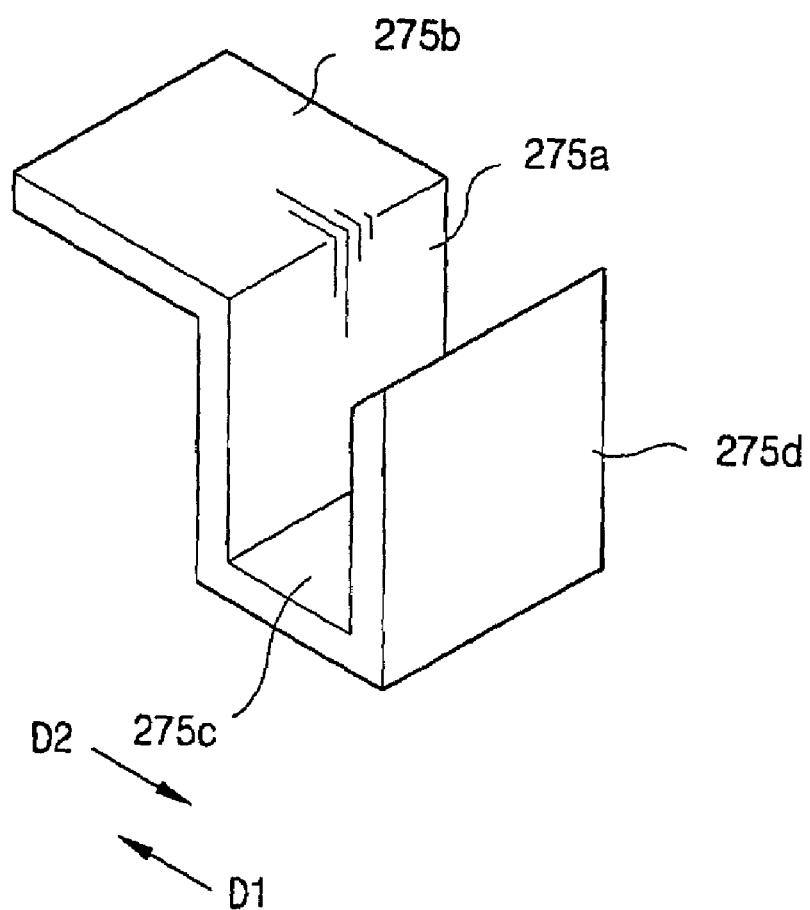
FIG. 9 is a perspective view showing a metal plate according to another exemplary embodiment of the present invention.
Figure 10:
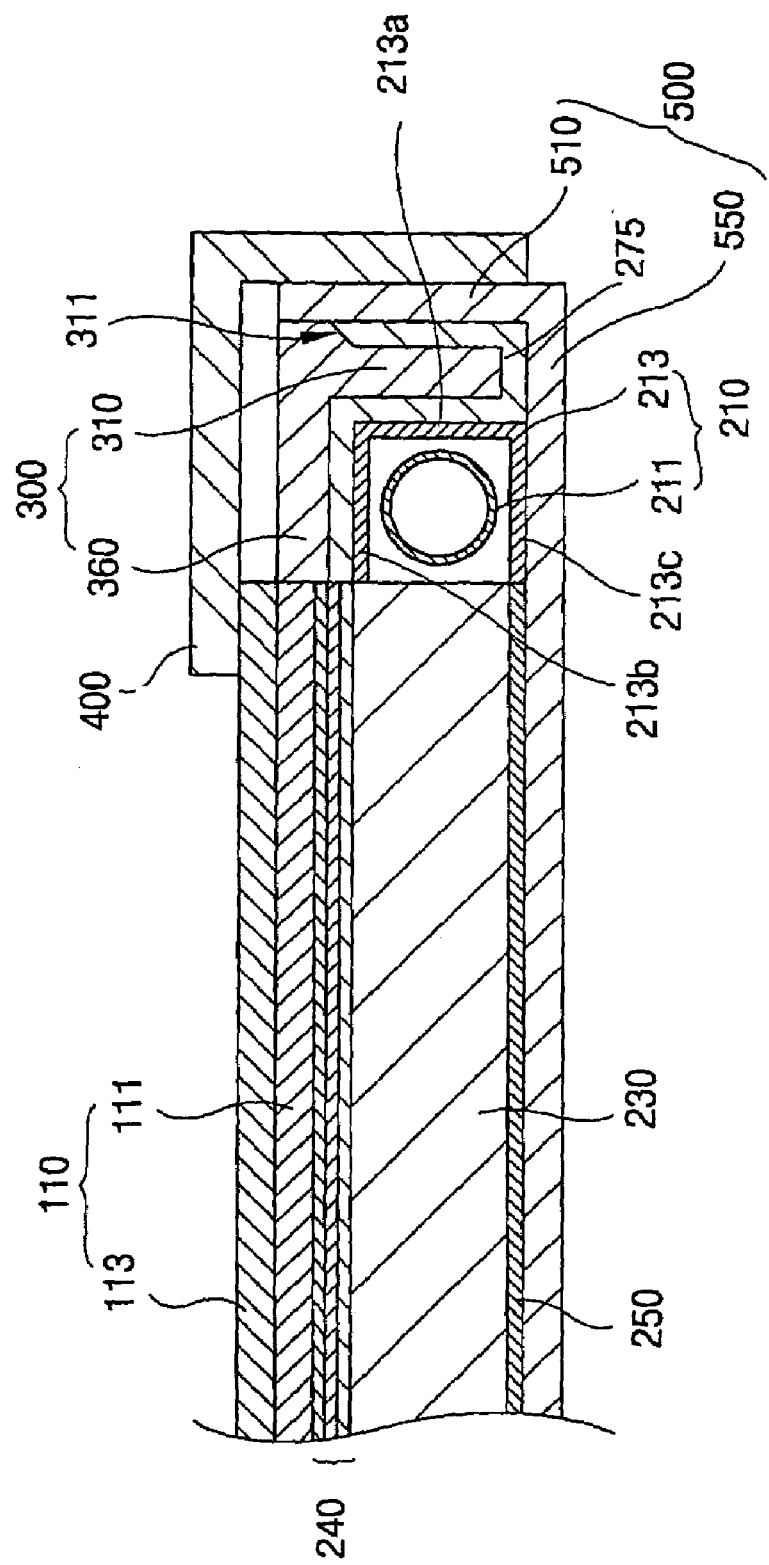
FIG. 10 is a cross-sectional view showing the metal plate assembled to the LCD apparatus shown in FIG. 2.

FIG. 9 is a perspective view showing a metal plate according to another exemplary embodiment of the present invention and FIG. 10 is a cross-sectional view showing the metal plate assembled to the LCD apparatus shown in FIG. 2. In this another embodiment, a first metal plate will be described as an exemplary embodiment of the present invention and second to fourth metal plates having structure same to that of the first metal plate will be omitted.

Referring to FIG. 9, the first metal plate 275 includes a first side surface 275a, a first upper surface 275b extended from one end portion of the first side surface 275a in a first direction D1 and a first bottom surface 275c extended from another end portion of the first side surface 275a in a second direction D2 opposite to the first direction D1. The first upper surface 275b and the first bottom surface 275c are perpendicular to the first side surface 275a. The first metal plate 275 includes a second side surface 275d extended from one end portion of the first bottom surface 275c. The second side surface 275d faces the first side surface 275b.

Referring to FIGS. 9 and 10, the first side surface 275a of the first metal plate 275 makes contact with the first reflecting surface 213a of the first lamp reflector 213 and the first upper surface 275b of the first metal plate 275 makes contact with the second reflecting surface 213b of the first lamp reflector 213. The first bottom surface 275c of the first metal plate 275 makes contact with the bottom surface 550 of the bottom chassis 500 and the second side surface 275d of the first metal plate 275 makes contact with the fifth sidewall 510 of the bottom chassis 500.

Accordingly, the contact area between the first metal plate 275 and the bottom chassis 500 may be broadened by the second side surface 275d, thereby increasing the heat conductivity of the first metal plate 275. Thus, the heat emitted from the first lamp unit 210 may be effectively discharged.

The mold frame 300 is provided with a receiving recess 311 disposed on the first sidewall 311 thereof so as to receive the second side surface 275d of the first metal plate 275. Particularly, an area, on which the receiving recess 311 is disposed, of the first sidewall 311 of the mold frame 300 has a thickness shallower than that of an area adjacent to the receiving recess 311 of the first sidewall 311. Thus, although the first metal plate 275 includes the second side surface 275d, it is able to prevent the size of the LCD apparatus 600 from increasing because the second side surface 275d is received into the receiving recess 311 of the first sidewall 310 of the mold frame 300.

Figure 11:
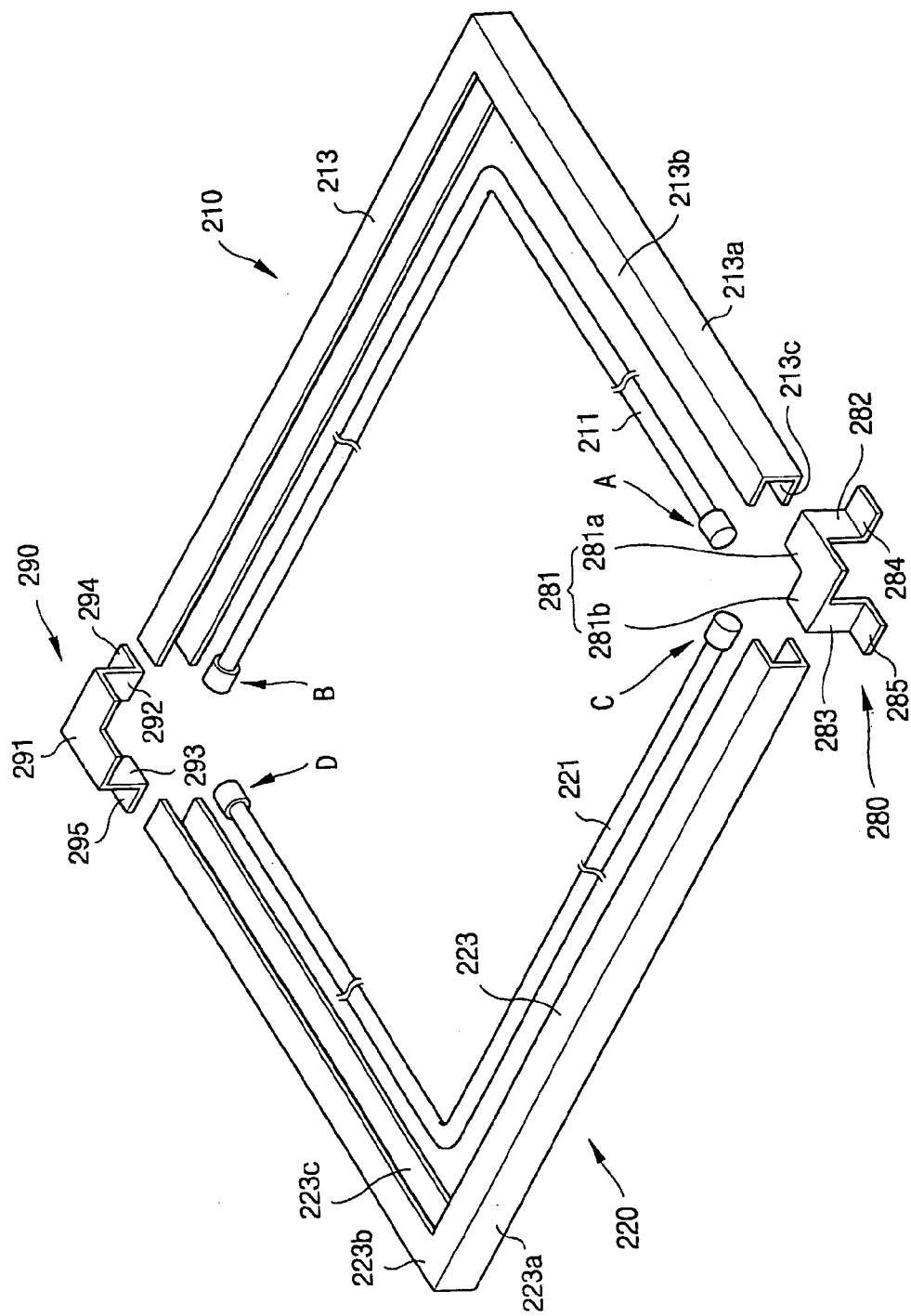
FIGS. 11 and 12 are perspective views showing a metal plate according to another exemplary embodiment of the present invention.
Figure 12:
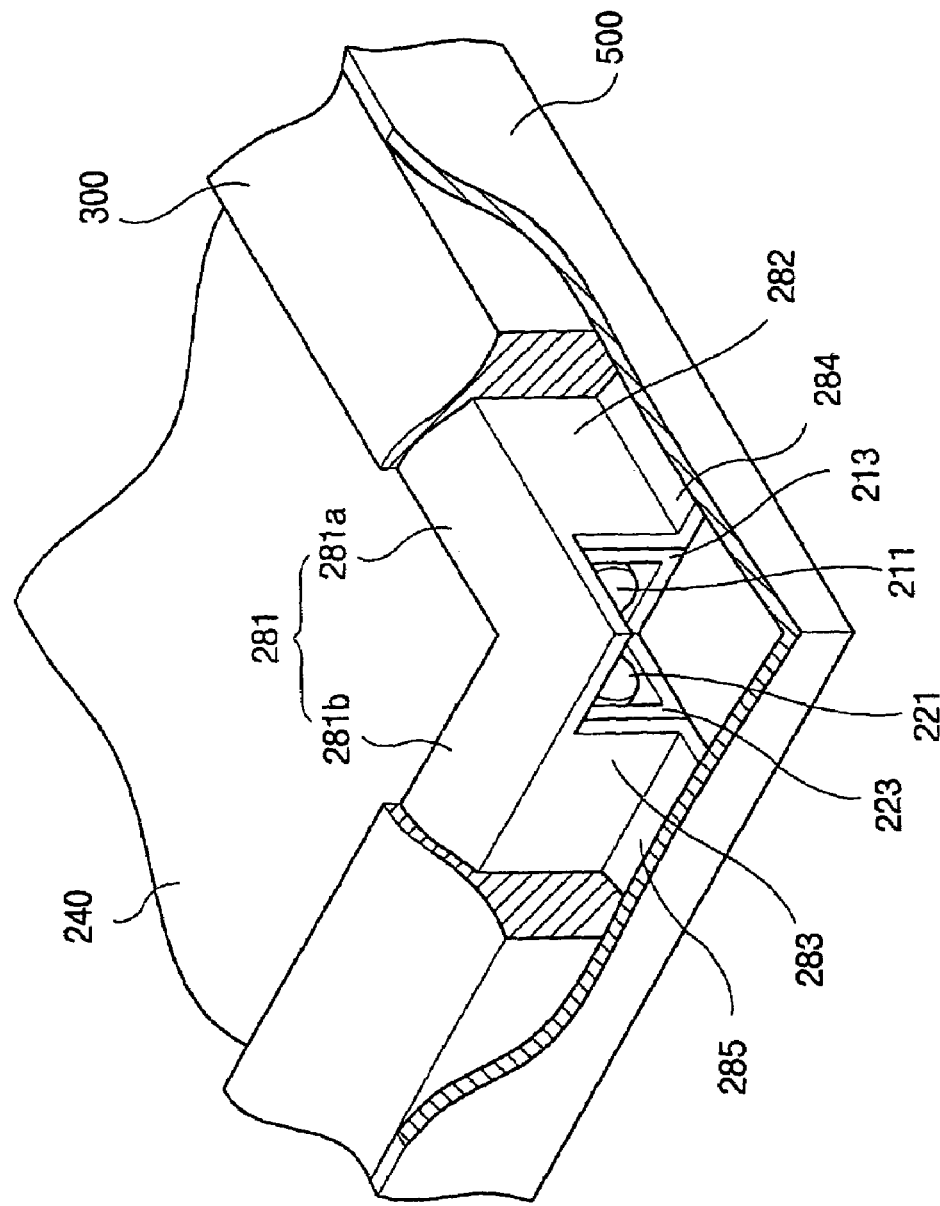

FIGS. 11 and 12 are perspective views showing a metal plate according to another exemplary embodiment of the present invention. In this embodiment, a fifth metal plate will be described as an exemplary embodiment of the present invention and a sixth metal plate having structure same to that of the fifth metal plate will be omitted.

Referring to FIGS. 11 and 12, the LCD apparatus 600 includes fifth and sixth metal plates 280 and 290 respectively disposed on electrode areas of the first and the second lamp units 210 and 220. The first electrode area "A" of the first lamp unit 210 faces the third electrode area "C" of the second lamp unit 220 and the second electrode area "B" of the first lamp unit 210 faces the fourth electrode area "D" of the second lamp unit 220. That is, the first and the second lamp units 210 and 220 received in the mold frame 300 has a rectangular frame shape.

The fifth metal plate 280 is disposed at the first electrode area "A" of the first lamp unit 210 and the third electrode area "C" of the second lamp unit 220 so that the first and the third electrode areas "A" and "C" are covered by the fifth metal plate 280 as shown in FIG. 12. The sixth metal plate 290 is disposed at the second electrode area "B" of the first lamp unit 210 and the fourth electrode area "D" of the second lamp unit 220 so that the second and the fourth electrode areas "B" and "D" are covered by the sixth metal plate 290.

Particularly, the fifth metal plate 280 includes an upper surface 281 having second and third upper surfaces 281a and 281b integrally formed with each other, a third side surface 282 extended from one end portion of the second upper surface 281a, a fourth side surface 283 extended from one end portion of the third upper surface 281b, a second bottom surface 284 extended from the third side surface 282 and a third bottom surface 285 extended from the fourth side surface 283.

The second upper surface 281a makes contact with the second reflecting surface 213b of the first lamp reflector 213 and the third side surface 282 makes contact with the first reflecting surface 213a of the first lamp reflector 213. The second bottom surface 284 makes contact with the third reflecting surface 213c of the first lamp reflector 213 and the bottom surface 550 of the bottom chassis 500.

The third upper surface 281b makes contact with the fifth reflecting surface 223b of the second lamp reflector 223 and the fourth side surface 283 makes contact with the fourth reflecting surface 223a of the second lamp reflector 223. The third bottom surface 285 makes contact with the sixth reflecting surface 223c of the second lamp reflector 223 and the bottom surface 550 of the bottom chassis 500.

The third and the fourth side surfaces 282 and 283 of the fifth metal plate 280 are separated from each other in a predetermined distance. The first and the second wires 214 and 215 electrically connected to the first and the second electrodes, respectively, may be withdrawn through the separated space between the third and the fourth side surfaces 282 and 283.

In FIG. 12, the second and the third bottom surfaces 284 and 285 of the fifth metal plate 280 are separated from each other in a predetermined distance. However, the second and the third bottom surfaces 284 and 285 may be integrally formed with each other so as to broaden the contact area between the fifth metal plate 280 and the bottom surface 550 of the bottom chassis 500.

Figure 13:
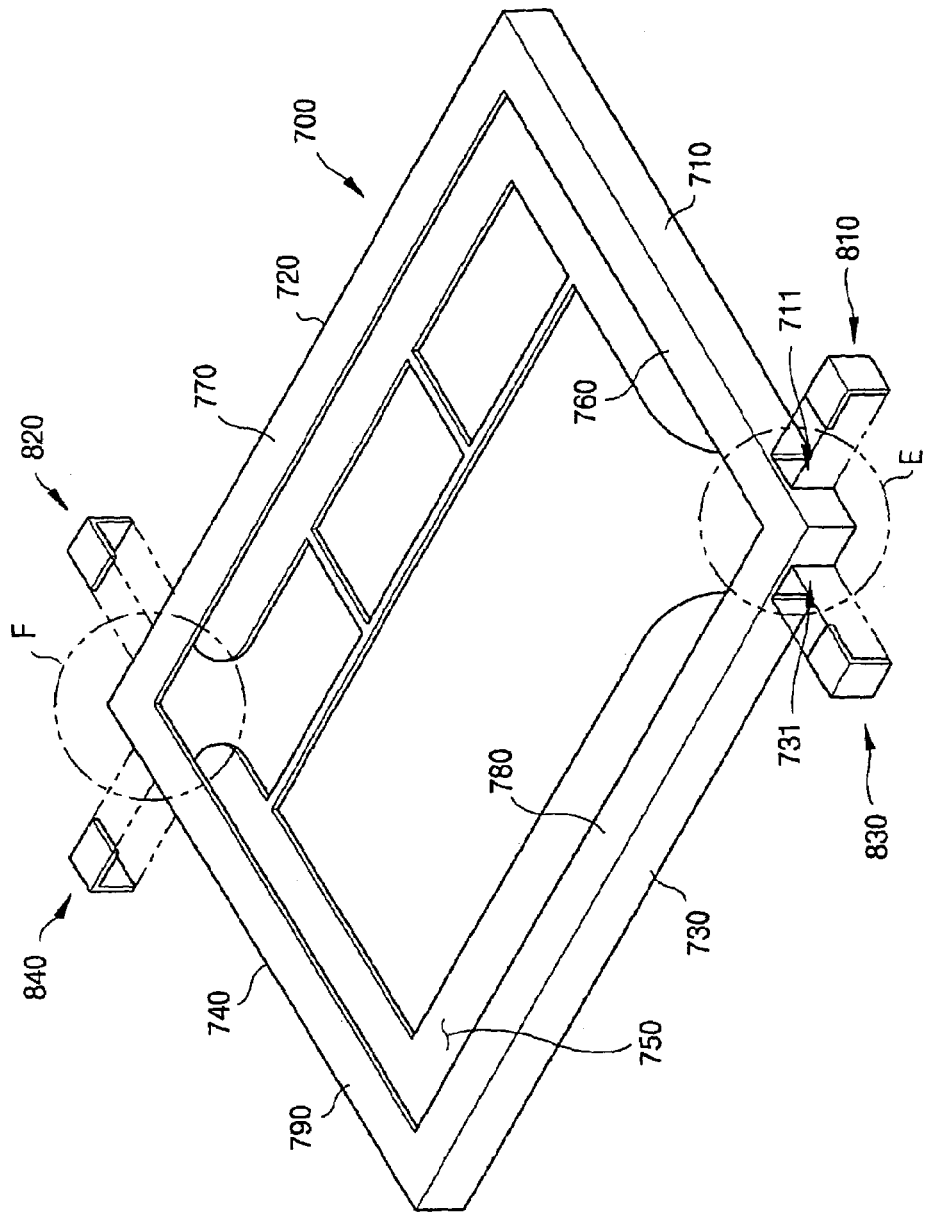
FIG. 13 is a perspective view showing a mold frame according to another exemplary embodiment of the present invention.
Figure 14:
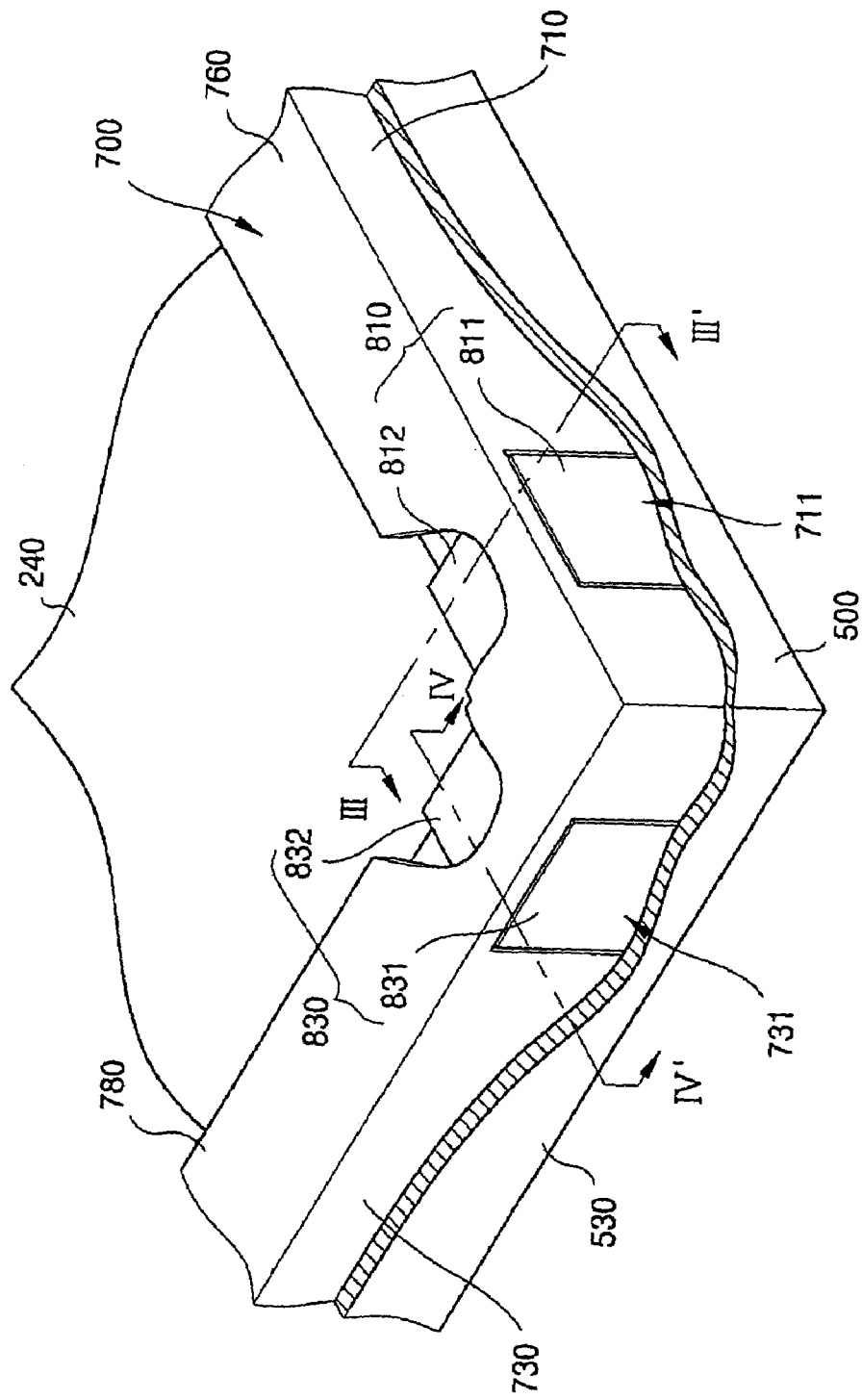
FIG. 14 is a partially-cut perspective view showing seventh to tenth metal plates assembled to the mold frame shown in FIG. 13.

FIG. 13 is a perspective view showing a mold frame according to another exemplary embodiment of the present invention. FIG. 14 is a partially-cut perspective view showing seventh to tenth metal plates assembled to the mold frame shown in FIG. 13.

Referring to FIG. 13, the mold frame 700 includes a bottom surface 750, first to fourth sidewalls 710, 720, 730 and 740 extended from the bottom surface 750 and first to fourth upper surfaces 760, 770, 780 and 790 respectively extended from the first to fourth sidewalls 710, 720, 730 and 740 and facing to the bottom surface 750.

The bottom surface 750 of the mold frame 700 are partially cut-away at a first edge portion "E" that the first and the third sidewalls 710 and 730 are connected to each other and at a second edge portion "F" that the second and fourth sidewalls 720 and 740 are connected to each other. Also, the first sidewall 710 is provided with a first opening 711 disposed at the first edge portion "E" and the third sidewall 730 is provided with a second opening 731 disposed at the first edge portion "E". Also, the second sidewall 720 is provided with a third opening (not shown) at the second edge portion "F" and the fourth sidewall 740 is provided with a fourth opening (not shown) at the second edge portion "F".

The mold frame 700 receives the seventh to the tenth metal plate 810, 820, 830 and 840. Particularly, the seventh metal plate 810 is received in the mold frame 700 through the first opening 711 so that the seventh metal plate 810 makes contact with the first upper surface 760 and the eighth metal plate 820 is received in the mold frame 700 through the third opening (not shown) so that the eighth metal plate 820 makes contact with the second upper surface 770. The ninth metal plate 840 is received in the mold frame 700 through the second opening 731 so that the ninth metal plate 840 makes contact with the third upper surface 780 and the tenth metal plate 840 is received in the mold frame 700 through the fourth opening (not shown) so that the tenth metal plate 840 makes contact with the fourth upper surface 790.

As shown in FIG. 14, the seventh metal plate 810 includes a first side surface 811 and a first upper surface 812 extended from one end portion of the first side surface 811 and perpendicular to the first side surface 811. The ninth metal plate 830 includes a second side surface 831 and a second upper surface 832 extended from one end portion of the second side surface 831 and perpendicular to the second side surface 831.

When the seventh and the ninth metal plates 810 and 830 are received in the mold frame 700, the first upper surface 812 of the seventh metal plate 810 makes contact with the first upper surface 760 of the mold frame 700 and the second upper surface 832 of the ninth metal plate 830 makes contact with the third upper surface 780 of the mold frame 700. The first side surface 811 of the seventh metal plate 810 is exposed through the first opening 711 and the second side surface 831 of the ninth metal plate 830 is exposed through the second opening 731.

Figure 15:
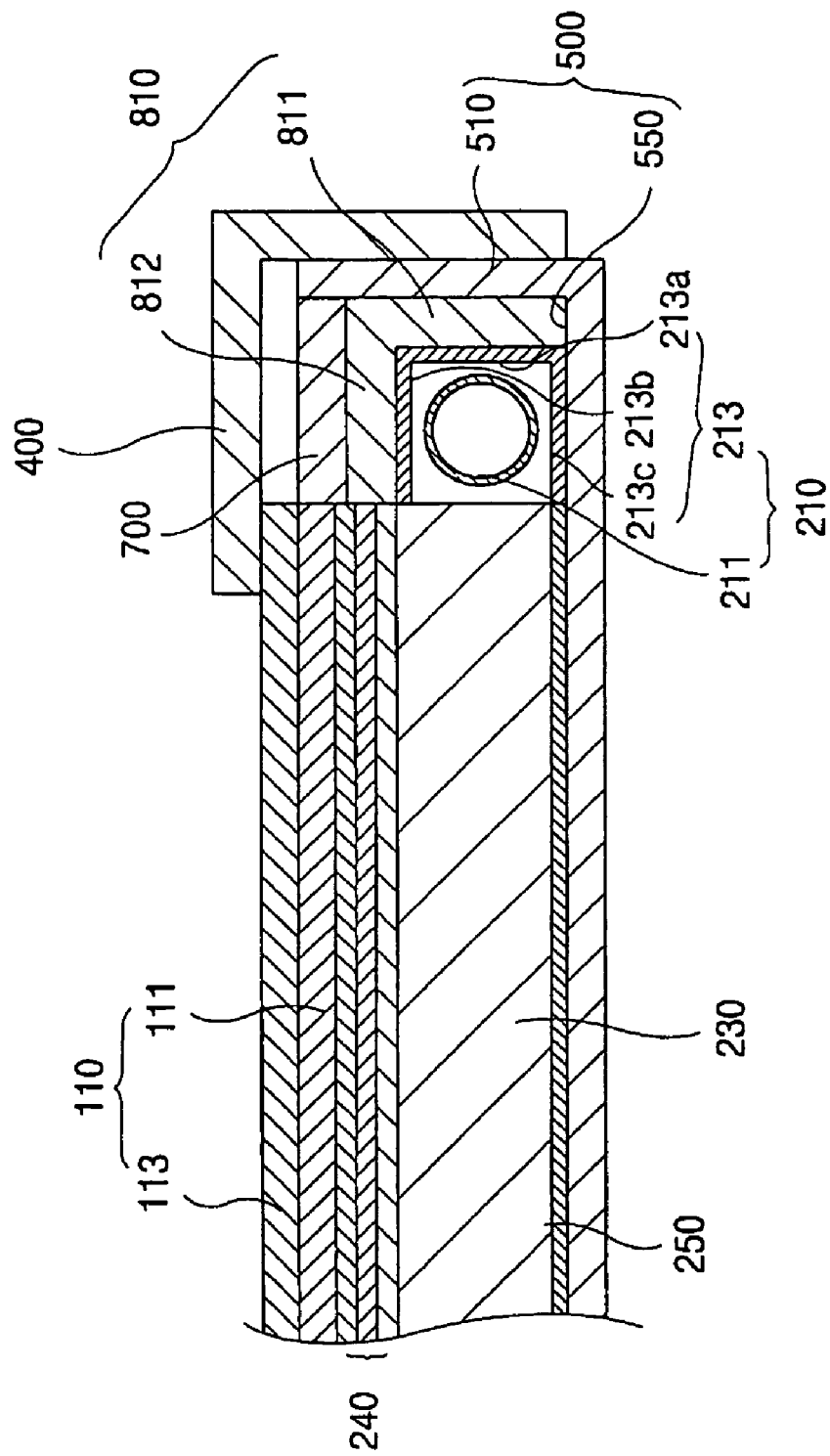
FIG. 15 is a cross-sectional view taken along the line III–III' showing the mold frame and the seventh metal plate shown in FIG. 14.
Figure 16:
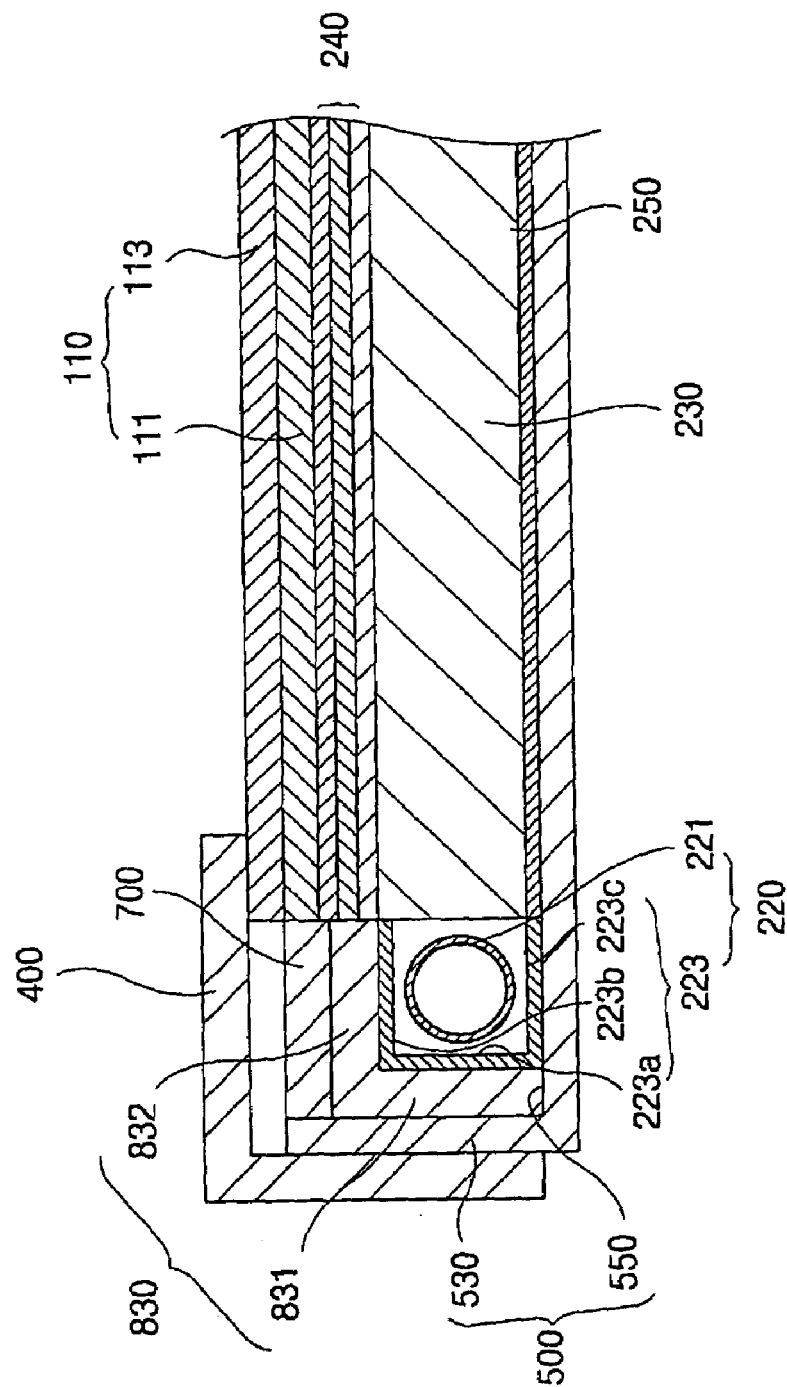
FIG. 16 is a cross-sectional view taken along the line IV–IV' showing the mold frame and the ninth metal plate shown in FIG. 14.

FIG. 15 is a cross-sectional view taken along the line III–III' showing the mold frame and the seventh metal plate shown in FIG. 14. FIG. 16 is a cross-sectional view taken along the line IV–IV' showing the mold frame and the ninth metal plate shown in FIG. 14.

Referring to FIGS. 15 and 16, the mold frame 700 receives the first and the second lamp units 210 and 220. The first lamp unit 210 includes the first L-shaped lamp 211 and the first lamp reflector 213 for covering the first L-shaped lamp 211. The second lamp unit 220 includes the second L-shaped lamp 221 and the second lamp reflector 223 for covering the second L-shaped lamp 223. The first and the second lamp reflectors 213 and 223 having an L shape same to that of the first and the second L-shaped lamps 211 and 221.

Particularly, the first lamp reflector 213 includes the first reflecting surface 213a, the second reflecting surface 213b extended from a first end portion of the first reflecting surface 213a and the third reflecting surface 213c extended from a second end portion opposite to the first end portion of the first reflecting surface 213a. The second and the third reflecting surfaces 213b and 213c are facing to each other and perpendicular to the first reflecting surface 213a.

The second lamp reflector 223 includes the fourth reflecting surface 223a, the fifth reflecting surface 223b extended from a first end portion of the fourth reflecting surface 223a and the sixth reflecting surface 223c extended from a second end portion opposite to the first end portion of the fourth reflecting surface 223a. The fifth and the sixth reflecting surfaces 223b and 223c are facing to each other and perpendicular to the fourth reflecting surface 223a.

Accordingly, when the first and the second lamp units 210 and 220 are received in the mold frame 700, the first reflecting surface 213a of the first lamp reflector 213 makes contact with the first side surface 811 of the seventh metal plate 810 and the second reflecting surface 213b makes contact with the first upper surface 812 of the seventh metal plate 810. Also, the fourth reflecting surface 223a of the second lamp reflector 223 makes contact with the second side surface 831 of the ninth metal plate 830 and the fifth reflecting surface 223b of the second lamp reflector 223 makes contact with the second upper surface 832 of the ninth metal plate 830. The reflecting plate 250, the light guide plate 230 and the optical sheet 240 are sequentially received in the mold frame 700.

The mold frame 700 is received in the bottom chassis 500 while receiving the first and second lamp units 210 and 220, the reflecting plate 250, the light guide plate 230 and the optical sheet 240.

As shown in FIGS. 15 and 16, when the mold frame 700 is received in the bottom chassis 500, the first side surface 811 of the seventh metal plate 810 makes contact with the fifth sidewall 510 of the bottom chassis 500 and the second side surface 831 of the ninth metal plate 830 makes contact with the seventh sidewall 530 of the bottom chassis 500.

The seventh metal plate 810 that makes contact with the first lamp reflector 213 and the fifth sidewall 510 may transfer the heat emitted from the first L-shaped lamp 211 to the bottom chassis 500. Also, the ninth metal plate 830 that makes contact with the second lamp reflector 223 and the seventh sidewall 530 may transfer the heat emitted from the second L-shaped lamp 221 to the bottom chassis.

INDUSTRIAL APPLICABILITY

According to the backlight assembly and the LCD apparatus, the heat transfer member comprised of metal material having superior heat conductivity makes contact with the bottom chassis through the lamp unit. The heat emitted from the lamp unit is transferred to the bottom chassis through the heat transfer member and discharged from the bottom chassis to exterior.

Thus, the backlight assembly and the LCD apparatus may prevent various parts disposed therein from being damaged by the heat emitted from the lamp unit and improve display characteristics thereof.

This invention has been described above with reference to the aforementioned embodiments. It is evident, however, that many alternative modifications and variations will be apparent to those having skills in the art in light of the foregoing description. Accordingly, the present invention embraces all such alternative modifications and variations as fall within the spirit and scope of the appended claims.

The invention claimed is:

1. A backlight assembly comprising:
a lamp unit for generating light;
a first receiving container having a first bottom surface and a first sidewall extended from the first bottom surface, for receiving the lamp unit such that the lamp unit faces the first sidewall;
a second receiving container having a second bottom surface and a second sidewall extended from the second bottom surface, for receiving the lamp unit and the first receiving container; and
a heat transfer member disposed at the lamp unit, for transferring heat emitted from the lamp unit to the second receiving container.

2. The backlight assembly of claim 1, wherein the lamp unit comprises:
a lamp having a lamp tube and first and second electrodes disposed at opposite end portions, respectively; and
a lamp reflecting plate for covering the lamp to reflect the light in a predetermined direction.

3. The backlight assembly of claim 2, wherein the heat transfer member comprises:
a first metal plate came in contact with an outer surface of the lamp reflecting plate corresponding to the first electrode and the second receiving container; and
a second metal plate came in contact with an outer surface of the lamp reflecting plate corresponding to the second electrode and the second receiving container.

4. The backlight assembly of claim 2, wherein the lamp reflector comprises polyethylene terephthalate resin.

5. The backlight assembly of claim 4, wherein the second receiving container comprises aluminum or aluminum alloy.

6. The backlight assembly of claim 5, wherein the heat transfer member comprises aluminum or aluminum alloy.

7. The backlight assembly of claim 1, wherein the lamp unit comprises:
a first L-shaped lamp having a first lamp tube and first and second electrodes disposed at opposite end portions, respectively, for generating the light;
a first lamp reflecting plate for covering the first L-shaped lamp to reflect the light in a predetermined direction;
a second L-shaped lamp having a second lamp tube, a third electrode disposed at a first end portion of the second lamp tube and facing the first electrode, and a fourth electrode disposed at a second end portion opposite to the first end portion of the second lamp tube and facing the second electrode; and
a second lamp reflecting plate for covering the second L-shaped lamp to reflect the light in the predetermined direction.

8. The backlight assembly of claim 6, wherein the heat transfer member comprises:
a first metal plate came in contact with an outer surface of the first lamp reflecting plate corresponding to the first electrode and the second bottom surface of the second receiving container;
a second metal plate came in contact with the outer surface of the first lamp reflecting plate corresponding to the second electrode and the second bottom surface of the second receiving container;
a third metal plate came in contact with an outer surface of the second lamp reflecting plate corresponding to the third electrode and the second bottom surface of the second receiving container; and
a fourth metal plate came in contact with the outer surface of the second lamp reflecting plate corresponding to the fourth electrode and the second bottom surface of the second receiving container.

9. The backlight assembly of claim 8, wherein the first to fourth metal plates respectively comprise:
a first side surface;
a first upper surface extended from the first sidewall in a first direction; and
a third bottom surface extended from the first sidewall in a second direction opposite to the first direction.

10. The backlight assembly of claim 9, wherein the first receiving container further comprises a second upper surface extended from the first sidewall of the first receiving container, the second upper surface being provided with a first engaging hole and the first upper surface being provided with a first engaging protrusion corresponding to the first engaging hole.

11. The backlight assembly of claim 9, wherein the third bottom surface comprises a second engaging hole and the second bottom surface comprises a second engaging protrusion corresponding to the second engaging hole.

12. The backlight assembly of claim 7, wherein the heat transfer member comprises:
a first metal plate came in contact with outer surfaces of the first and second lamp reflecting plates, which are corresponding to the first and third electrodes, respectively, and the second receiving container; and a second metal plate came in contact with outer surfaces of the first and second lamp reflecting plates, which are corresponding to the second and fourth electrodes, respectively, and the second receiving container.

13. The backlight assembly of claim 12, wherein the first and second metal plates respectively comprise:
   an L-shaped upper surface having first and second upper surfaces integrally combined to each other;
   a first side surface extended from the first upper surface;
   a second side surface extended from the second upper surface and separated from the first side surface in a predetermined distance;
   a first bottom surface extended from the first side surface; and
   a second bottom surface extended from the second side surface.

14. An LCD apparatus comprising:
   a lamp unit for generating light;
   a first receiving container having a first bottom surface and a first sidewall extended from the first bottom surface, for receiving the lamp unit such that the lamp unit faces the first sidewall;
   a second receiving container having a second bottom surface and a second sidewall extended from the second bottom surface, for receiving the lamp unit and the first receiving container;
   a heat transfer member disposed at the lamp unit, for transferring heat emitted from the lamp unit to the second receiving container; and
   an LCD panel for receiving the light and displaying image in response to the light.

15. The LCD apparatus of claim 14, wherein the lamp unit comprises:
   a first L-shaped lamp having a first lamp tube and first and second electrodes disposed at opposite end portions of the first lamp tube, for generating the light;
   a first lamp reflecting plate for covering the first L-shaped lamp to reflect the light in a predetermined direction;
   a second L-shaped lamp having a second lamp tube, a third electrode disposed at a first end portion of the second lamp tube and facing the first electrode, and a fourth electrode disposed at a second end portion of the second lamp tube and facing the second electrode, for generating the light; and
   a second lamp reflecting plate for covering the second L-shaped lamp to reflect the light in a predetermined direction.

16. The LCD apparatus of claim 15, wherein the first receiving container comprises first to fourth openings corresponding to the first to fourth electrodes, respectively.

17. The LCD apparatus of claim 16, wherein the heat transfer member comprises:
   a first metal plate came in contact with an outer surface of the first lamp reflecting plate corresponding to the first electrode and a second side surface of the second receiving container through the first opening;
   a second metal plate came in contact with the outer surface of the first lamp reflecting plate corresponding to the second electrode and the second side surface of the second receiving container through the second opening;
   a third metal plate came in contact with an outer surface of the second lamp reflecting plate corresponding to the third electrode and the second side surface of the second receiving container through the third opening; and
   a fourth metal plate came in contact with the outer surface of the second lamp reflecting plate corresponding to the fourth electrode and the second side surface of the second receiving container through the fourth opening.

18. The LCD apparatus of claim 15, wherein the first and second lamp reflecting plate comprise polyethylene terephthalate resin.

* * * * *